Oct. 4, 1938.   H. E. SKELTON   2,132,275
NONSKID TIRE CONSTRUCTION
Filed June 12, 1937
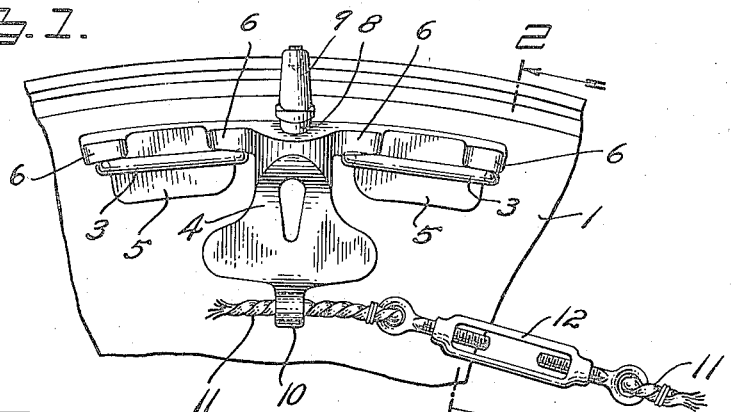
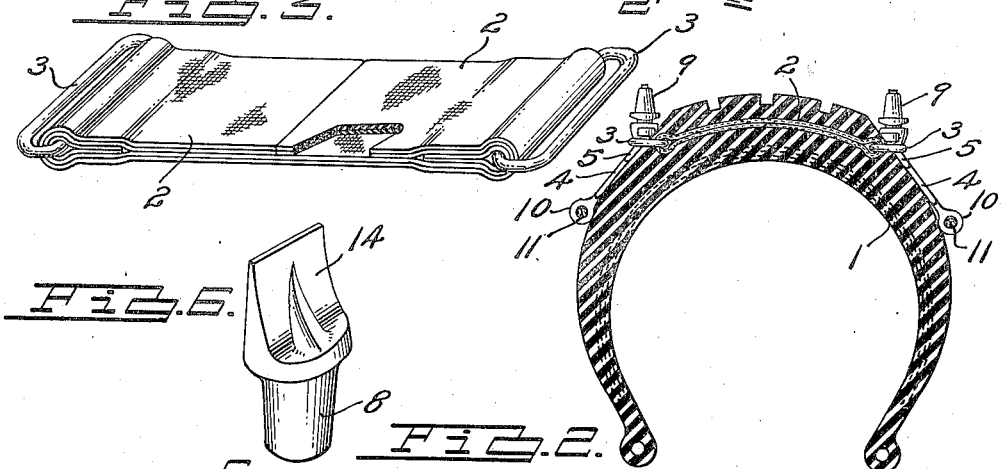
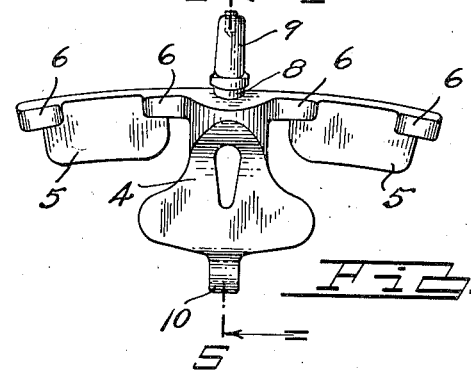
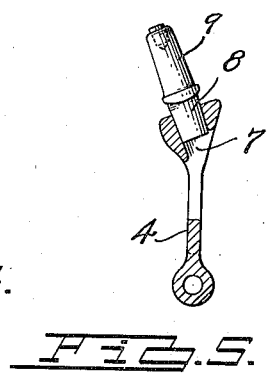
INVENTOR.
Harry E. Skelton
BY
ATTORNEY.

Patented Oct. 4, 1938

2,132,275

UNITED STATES PATENT OFFICE 2,132,275

NONSKID TIRE CONSTRUCTION

Harry E. Skelton, Birmingham, Mich.

Application June 12, 1937, Serial No. 147,829

4 Claims. (Cl. 152—208)

This invention relates to non-skid tire constructions and the object of the invention is to provide a tire structure in which a series of detachable brackets are secured to the opposite sides of the tire and the brackets each supporting driving calks which extend beyond the surface of the tire tread.

Another object of the invention is to provide a non-skid tire construction in which the brackets may be detached from the tire when desired to present the normal tire tread to the road surface.

A further object of the invention is to provide a series of transverse fabric bands embedded in the tire tread and carrying the supporting links in which the brackets are mounted.

Another object of the invention is to provide a tire construction having a series of links extending from the side walls of the tire and a series of brackets being mounted in the links, each bracket engaging in two adjacent links and supporting a stud or drive calk which extends slightly beyond the tire tread.

A further object of the invention is to provide a series of brackets on each side of the tire in which the brackets are connected together by a cable arranged to be tightened to hold the brackets in place in the links.

Another object of the invention is to provide a bracket construction whereby standard horse shoe calks may be fitted into the brackets to allow the calks to be interchanged or replaced with different type calks.

These objects and the several novel features of the invention are hereinafter more fully described and claimed and the preferred form of construction by which these objects are attained is shown in the accompanying drawing in which—

Fig. 1 is an elevation of a non-skid tire construction embodying my invention.

Fig. 2 is a section taken on line 2—2 of Fig. 1.

Fig. 3 is a perspective view of one of the transverse fabric bands carrying the links in which the brackets are supported.

Fig. 4 is an elevation of a bracket and calk mounted therein.

Fig. 5 is a section taken on line 5—5 of Fig. 4.

Fig. 6 is a perspective view of an alternative form of driving calk.

The tire is shown more particularly in Fig. 1 and this tire 1 is provided with a series of transverse fabric or fabric and rubber bands 2. One of these bands is shown more particularly in Fig. 3 and consists of a series of layers of fabric preferably impregnated with rubber and carrying a link 3 in each end. The fabric bands 2 are reenforced at their outer ends as shown in Fig. 3 and these bands are embedded in the tire 1 as shown in Fig. 2 so that the links 3 extend from the side walls of the tire. In the normal construction, approximately twenty of these transverse bands 2 are provided about the periphery of the tire and extend transversely of the tire as will be understood from Fig. 2. With twenty of these bands embedded in the tire tread there will be twenty links 3 on each side of the tire.

One of the brackets is shown more particularly in Fig. 4 and comprises a central portion 4 having extensions on each side thereof at the top. Each extension is provided with a depending flange 5 and stop lugs or shoulders 6 are formed in the bracket to rest on the links 3 as shown in Figs. 1 and 2. As shown in Fig. 5, each bracket at the center is provided with a tapered aperture 7 and the tapered end 8 of a drive calk 9 may be driven into this tapered aperture 7 until it is a tight fit therein. These drive calks may be standard horse shoe calks which are interchangeable by driving one calk out and driving another calk in its place so that as the calks become worn they may be replaced by new calks or different shaped drive calks, if desired.

The brackets are mounted on the tire by inserting the depending flanges 5 through a pair of adjacent links 3 as will be understood from Figs. 1 and 2. These flanges 5 are inserted until the lugs 6 rest on the links and if twenty links are provided about a certain size tire, ten brackets will be supported in place on the ten pairs of links on each side of the tire. This provides a series of ten driving calks which extend beyond the periphery of the tire and contact the road surface to provide traction under adverse road conditions.

As shown in Fig. 4, the lower end 10 of each bracket is provided with an aperture to receive a cable 11. This cable 11 is threaded through the ends 10 of the several brackets and may be taken up by means of a turnbuckle 12 shown in Fig. 1. The cable and turnbuckle provides a means for holding the several brackets in place in the links on the tire and, at the same time, the turnbuckle may be loosened to loosen the cable and allow removal of the brackets from the links 3 when desired.

An alternative form of driving calk is shown in Fig. 6 in which the standard tapered lower end 8 is provided but a different driving head 14 is formed integrally with the tapered base. This illustrates one alternative form of driving calk but a number of different alternative forms may be used as will be readily understood. While I have described ten brackets about each side of the tire, any number of brackets may be used. With ten brackets about the tire, it insures at least two driving calks being in contact with the road at all times but more or less may be provided as desired. By this construction, the drive calks will prevent side slip as well as wheel spinning and as the tire tread wears down shorter drive calks may be replaced in the brackets so that the calks do not extend too far beyond the tire periphery.

From the foregoing description, it becomes evident that the device is very simple and efficient in operation in which the brackets may be easily applied to or removed from the tire, provides for interchangeability and replacement of driving calks in which the calks act as unitary parts of the tire and provides a device which accomplishes the objects described.

Having thus fully described my invention, its utility and mode of operation, what I claim and desire to secure by Letters Patent of the United States is—

1. In a non-skid tire construction, a tire, a series of transverse fabric bands embedded in the tire, a link secured in each end of each band and extending from the adjacent side wall of the tire, a series of brackets each having a pair of depending flanges, the flanges of the brackets being engaged in adjacent links and the brackets being provided with shoulders resting on the links, the depending flanges and bracket being shaped to fit the respective side wall of the tire, a stud extending from each bracket beyond the tire tread and a cable connecting the brackets and holding the brackets in position in the links.

2. In a non-skid tire construction, a tire, a series of transverse bands embedded in the tire, a link secured to each end of each band and extending from the sides of the tire, a series of brackets supported in the links and a driving calk extending from each bracket.

3. In a non-skid tire construction, a tire, a series of links extending from each side of the tire, a series of brackets each having a pair of spaced depending flanges adapted to fit into adjacent links, the flanges fitting against the side walls of the tire and a driving calk carried by each bracket.

4. In a non-skid tire construction, a tire, a series of supports extending from each side of the tire, a series of brackets engaging in the supports and fitting against the side wall of the tire, a driving calk in each bracket extending beyond the periphery of the tire and a continuous cable on each side of the tire connecting the brackets and retaining the same in the supports.

HARRY E. SKELTON.